(12) United States Patent
Davis (10) Patent No.: US 10,434,025 B1
(45) Date of Patent: Oct. 8, 2019

(54) CASKET CENTER PANEL (71) Applicant: Vandor Corporation, Richmond, IN (US)

(72) Inventor: Justin F. Davis, Richmond, IN (US)

(73) Assignee: Vandor Corporation, Richmond, IN (US)

( * ) Notice: Subject to any disclaimer, the term of this patent is extended or adjusted under 35 U.S.C. 154(b) by 0 days.

(21) Appl. No.: 15/968,202

(22) Filed: May 1, 2018

(51) Int. Cl.
*A61G 17/007* (2006.01)
*A61G 17/04* (2006.01)
*B32B 5/18* (2006.01)
*B32B 5/02* (2006.01)
*B32B 5/06* (2006.01)
*B32B 5/24* (2006.01)

(52) U.S. Cl.
CPC ......... *A61G 17/007* (2013.01); *A61G 17/042* (2016.11); *B32B 5/022* (2013.01); *B32B 5/028* (2013.01); *B32B 5/06* (2013.01); *B32B 5/18* (2013.01); *B32B 5/245* (2013.01); *B32B 2266/0278* (2013.01); *B32B 2307/4023* (2013.01); *B32B 2307/41* (2013.01); *B32B 2439/40* (2013.01); *B32B 2451/00* (2013.01); *B32B 2607/02* (2013.01)

(58) Field of Classification Search
CPC ...... A61G 17/007; A61G 17/02; A61G 17/04; A61G 17/042; A61G 17/00; B32B 5/022; B32B 5/028; B32B 5/06; B32B 5/18; B32B 5/245; B32B 2266/0278; B32B 2307/4023; B32B 2307/41; B32B 2439/40; B32B 2451/00; B32B 2607/02

USPC .................................................. 27/19, 14
See application file for complete search history.

(56) References Cited

U.S. PATENT DOCUMENTS

| | | | | |
|---|---|---|---|---|
| 3,157,936 A | * | 11/1964 | Hillenbrand | A61G 17/04 27/19 |
| 3,344,494 A | * | 10/1967 | McClive | A61G 17/00 27/19 |
| 4,357,741 A | * | 11/1982 | Winburn | A61G 17/00 27/19 |
| 5,675,877 A | * | 10/1997 | Lewis | A61G 17/04 27/14 |
| 6,151,762 A | | 11/2000 | Cox | |
| 6,237,202 B1 | * | 5/2001 | Agee | A61G 17/04 27/14 |
| 6,742,231 B1 | * | 6/2004 | Calhoun | A61G 17/04 27/14 |
| 7,401,391 B2 | * | 7/2008 | Maple | A61G 17/04 27/19 |

(Continued)

*Primary Examiner* — William L Miller
(74) *Attorney, Agent, or Firm* — Maginot, Moore & Beck LLP (57) ABSTRACT

A center panel for a casket includes a backing panel, a pad, and a blackout panel. The backing panel includes a backing surface. The pad includes a lower pad surface and an upper pad surface. The lower pad surface is disposed on and is attached to the backing surface. The pad has a pad color or is configured to change to the pad color. The blackout panel includes a lower panel surface disposed on and attached to the upper pad surface, and has a first opacity that obstructs visibility of the pad color of the pad. The blackout panel also has a color that is lighter than the pad color. The backing panel, pad and blackout panel collectively have a shape and size configured to cover the area between decorative edge pieces of a casket lid.

20 Claims, 8 Drawing Sheets

(56) References Cited

U.S. PATENT DOCUMENTS

| | | | | |
|---|---|---|---|---|
| 8,307,519 | B2* | 11/2012 | Drew | A61G 17/02 27/19 |
| 8,667,653 | B2 | 3/2014 | Drew et al. | |
| 9,050,234 | B2* | 6/2015 | Cox | A61G 17/04 |
| 9,833,372 | B2 | 12/2017 | Denk et al. | |
| 2004/0158960 | A1* | 8/2004 | Shaw | A61G 17/04 27/14 |
| 2005/0150091 | A1* | 7/2005 | Parker | A61G 17/02 27/19 |
| 2008/0086855 | A1* | 4/2008 | Maple | A61G 17/04 27/19 |

* cited by examiner

CASKET CENTER PANEL

FIELD

This invention relates to the field of burial caskets, in particular burial casket lids.

BACKGROUND

Burial caskets typically include a casket body and a casket lid. At least a portion of the casket lid is capable of opening and being secured in an open position in order to allow viewing of the deceased. Because the inside of the casket lid is prominently displayed during a viewing, casket lids often include a decorative interior that is aesthetically pleasing to an individual viewing the casket.

In general, the unadorned underside of a casket lid includes structural elements such as wood or metal planks or supports, fasteners and the like. It is therefore desirable and commonplace to employ a casket lid interior assembly that includes fabric and shell structures to adorn and soften the underside of the casket lid frame.

Burial caskets can employ a wide variety of decorative designs for the interiors of casket lids. A common casket lid interior design includes rolls or decorative edge pieces and a center panel. Rolls are shaped design features that extend inward from each edge of the casket lid to form a picture frame effect. The center panel is disposed within the casket lid such that the center panel is substantially bordered by the rolls. Both the center panel and rolls hide the otherwise functional and non-aesthetic underside of the metal or wood (or paperboard) casket lid structural frame.

Typically, the rolls, center panel, and other decorative elements of the casket lid interior include a decorative fabric cover over a framed backing structure, typically made of cardboard, posterboard, and/or corrugated paper. The decorative cover may be a simple plain fabric cover, or a fabric cover with decorative stitching or other decorative elements.

In particular, the center panel cover can consist of a multiple layers of fabric sewn or stitched together. The center panel cover is affixed to and over a cardboard or paperboard center panel frame. An outermost layer of the center panel cover may consist of a decorative material having aesthetically appealing features. This layer is stitched or sewn to a lower layer of the cover, which in turn is glued, stapled or otherwise affixed to the center panel frame. In order to effectively stitch or sew the decorative layer to the lower layer, it is preferable to use a material for the lower layer that can be easily stitched or sewn into, and that produces a clean and smooth overall appearance between the decorative layer and the lower layer.

One such material is a foam pad. A foam pad can easily be stitched or sewn into, and provides for sew lines that are quite smooth and clean. This allows aesthetically desirable stitch patterns to be more easily achieved. However, a prominent issue with using such foam pads is that the original color of the pad can change over a short period of time, and can produce visually off-putting colors that can penetrate through the decorative layer and become visible to an individual viewing the casket. Because the outermost layer is typically thin and often white or close to white, the color of the foam pad can bleed through, providing an undesirable appearance.

Therefore, there is a need for a center panel cover for use in a center panel of a casket lid interior that includes layers that can effectively hide the colors of a foam pad, as well as hide any imperfections produced by stitching or sewing of the center panel layers.

SUMMARY

At least some embodiments discussed herein hide or absorb the colors of a foam pad in a center panel of a casket lid. A center panel cover in one embodiment includes a backing panel, a pad, and a blackout panel. The backing panel includes a backing surface. The pad includes a lower pad surface and an upper pad surface. The lower pad surface is disposed on and attached to the backing surface. The pad has a pad color or is configured to change to the pad color. The blackout panel includes a lower panel surface disposed on and attached to the upper pad surface. The blackout panel has a first opacity that obstructs visibility of the pad color of the pad, and also has a color that is lighter than the pad color. The backing panel, pad and blackout panel collectively have a shape and size configured to cover an interior defined between decorative edge pieces of a casket lid.

The center panel cover in a further embodiment further includes a decorative cloth panel having an opacity that is less than the first opacity of the blackout panel. The blackout panel further includes an upper blackout surface, and the decorative panel is disposed over and attached to the upper blackout surface.

Another embodiment is a casket that employs a center panel for a lid that has a similar center panel cover.

The above described features and advantages, as well as others, will become readily apparent to those of ordinary skill in the art by reference to the following detailed description and accompanying drawings.

DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 1:
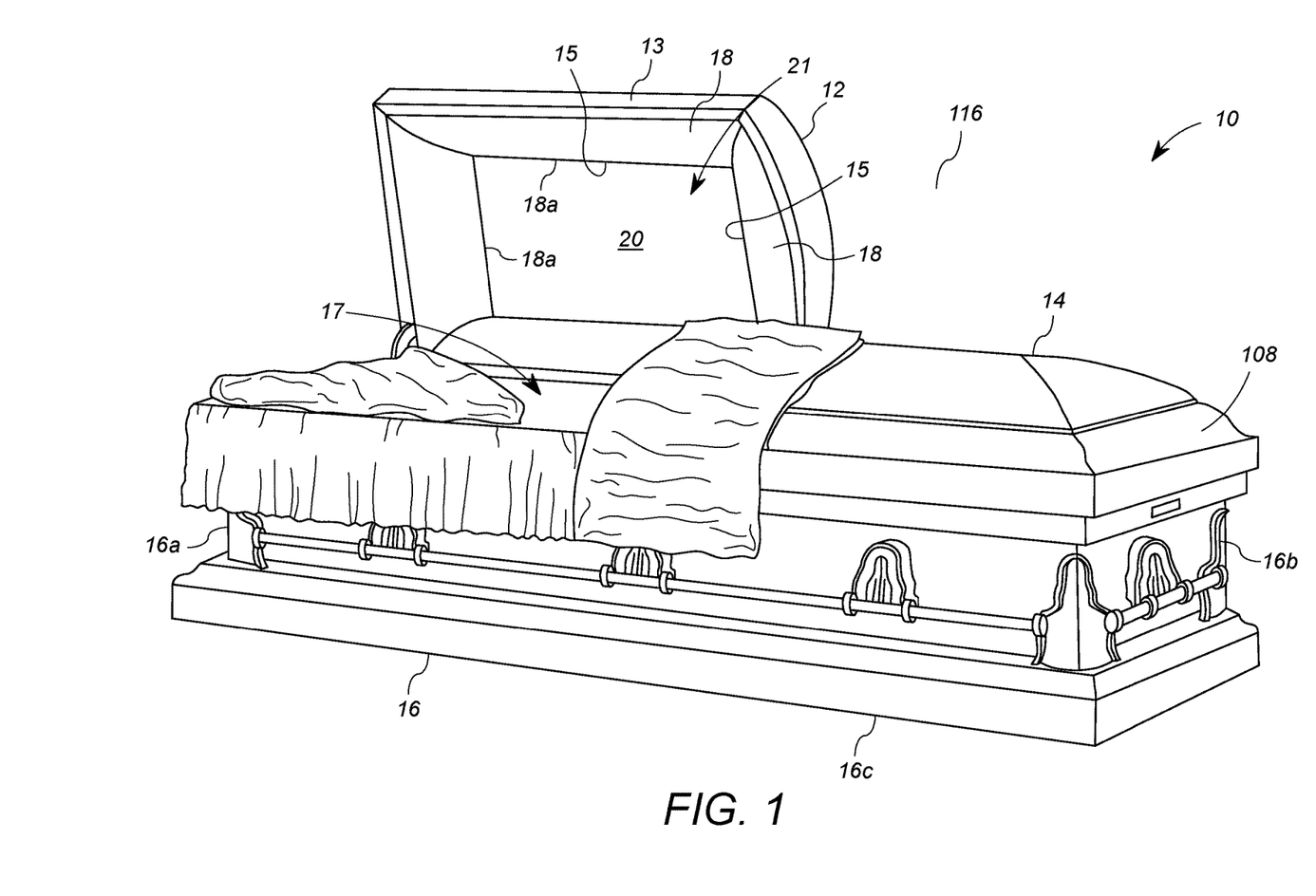
FIG. 1 depicts a perspective view of a burial casket having a casket lid according to one embodiment of the disclosure.

With reference to FIG. 1, one embodiment of a casket 10 having a center panel cover 20 is shown. The casket 10 includes a first casket lid section 12, a second casket lid section 14, a casket body 16, a plurality of rolls 18, and the center panel cover 20. The casket body 16 includes two side panels 16a, two end panels 16b, and a bottom panel 16c. The side panels 16a, the end panels 16b, and the bottom panel 16c are configured as a container having an interior 17 configured to receive and reasonably fit a deceased human body in a reclined position. The casket 10 is illustrated with the first casket lid section 12 in an open position to allow viewing of the deceased. In this embodiment, the center panel cover 20 is disposed on a center panel frame, not shown in FIG. 1 (but see center panel frame 130 of FIGS. 3-5), to collectively form a center panel 21.

The first casket lid section 12 includes a structural shell that includes the outer surface of the casket lid section 12, and a casket lid interior assembly that covers the underside of the structural shell. The casket lid interior assembly in this embodiment includes the plurality of rolls 18 and the center panel 21. The first casket lid 12 also includes an overhang 13 that forms a peripheral channel (not shown) in the underside of the first casket lid section 12.

The channel receives an outer edge of each of the plurality of rolls 18 in a trap fit or interference fit. In particular, the rolls 18 are decorative edge pieces that, in this embodiment, surround and form a frame around an interior 15 of the underside of the first casket lid section 12. The plurality of rolls 18 includes a plurality of inner edges 18a. Each roll 18 has a sculpted shape that extends arcuately inward from the overhang 13 of the first casket lid section 12 to the interior 15 of the first casket lid section 12. The plurality of inner edges 18a collectively form a housing for receiving the center panel 21 in the interior 15. The center panel 21, and hence the center panel cover 20, covers the interior 15 to hide any other structures of the underside of the structure shell of the first casket lid section 12. In the embodiment shown in FIG. 1, the plurality of rolls 18 includes first, second, third, and fourth rolls 18, each corresponding to one side of the rectangular center panel 21. The rolls 18 can include a layer of decorative material, preferably a decorative cloth panel, that extends around the entirety of each of the plurality of rolls 18.

Figure 2:
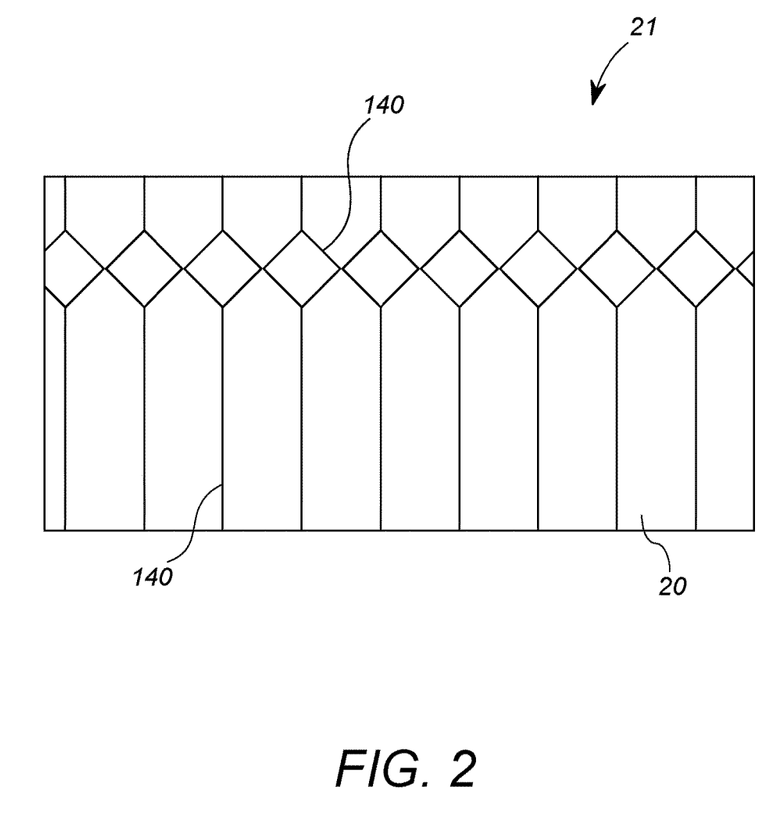
FIG. 2 shows a top plan view of the center panel of the casket lid of FIG. 1 including a center panel cover.
Figure 3:
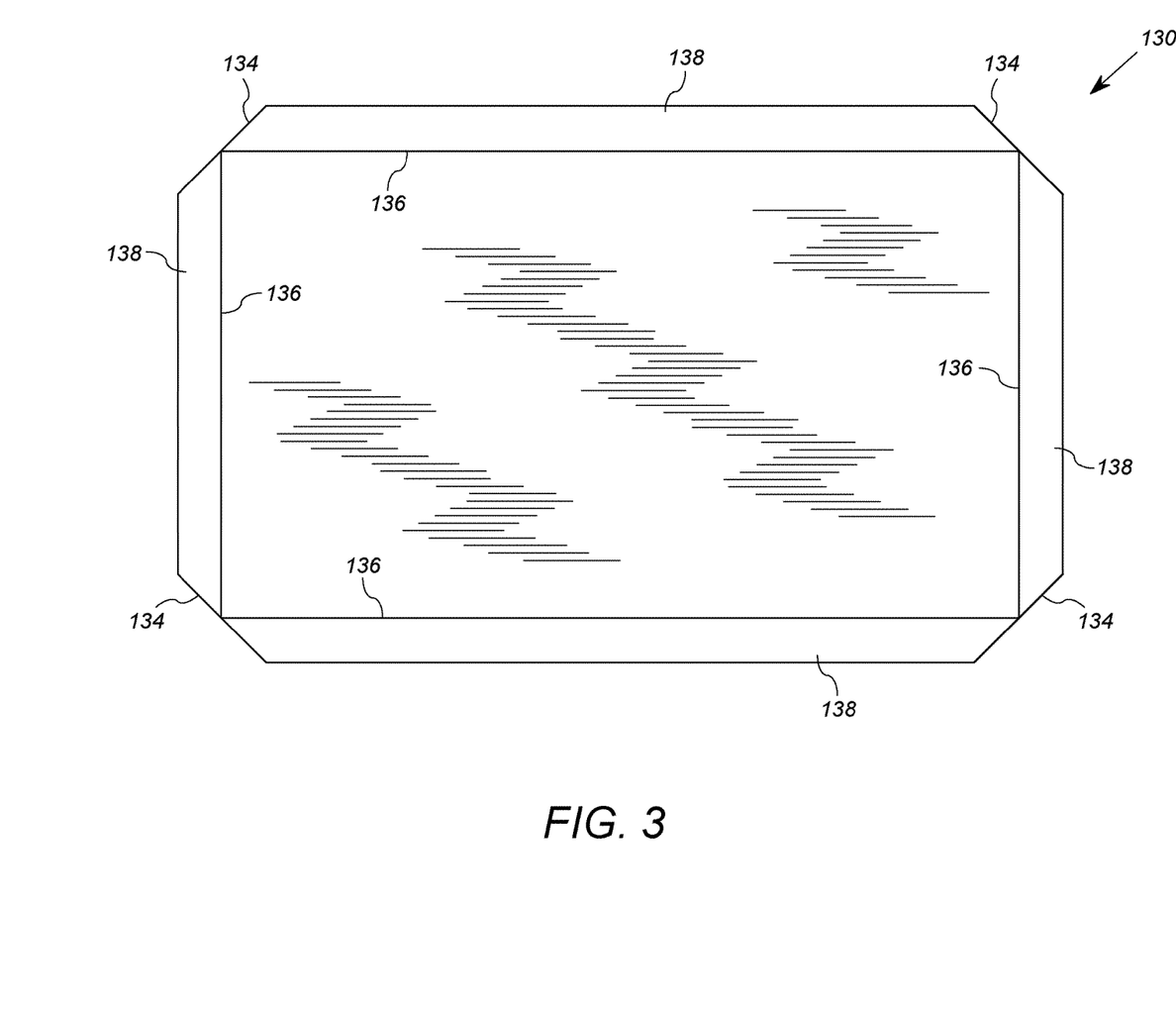
FIG. 3 shows a top plan view of an exemplary center panel frame that may be used in the center panel of FIG. 2.

FIG. 2 shows a top plan view of the center panel 21 including the center panel cover 20. As discussed above, the center panel 21 further includes a center panel frame, not shown in FIG. 2, to which the center panel cover 20 is coupled. The center panel frame is more rigid than the decorative center panel cover 20, and is sized and configured to fit into the interior 15. (See FIG. 1). FIG. 3 shows a top plan view of an exemplary center panel frame 130 that may be used in the center panel 21 of FIG. 2.

Figure 4:
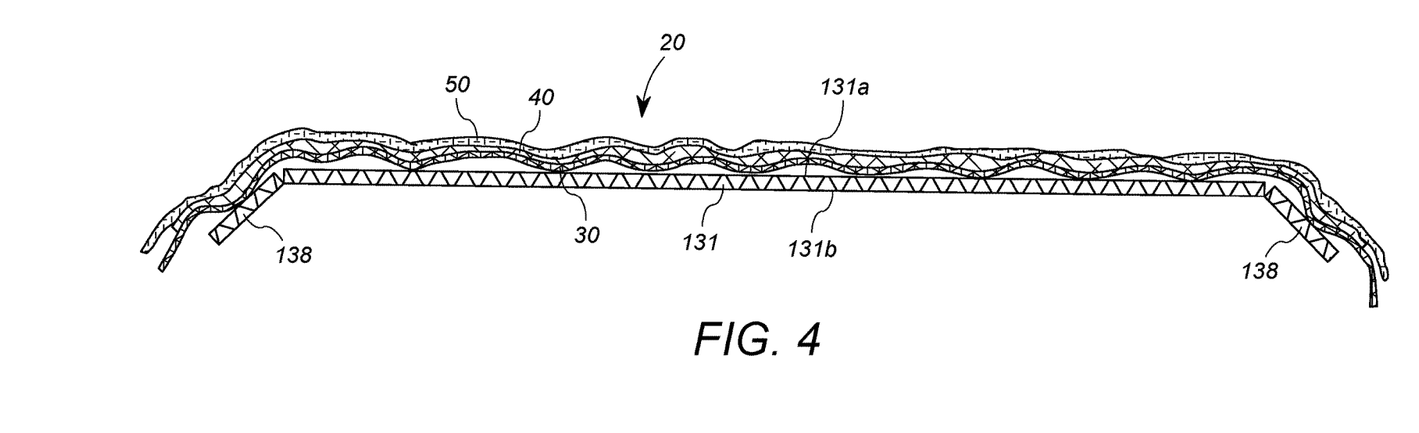
FIG. 4 shows a side cutaway view of the center panel of FIG. 2 in a partially assembled state.
Figure 5:
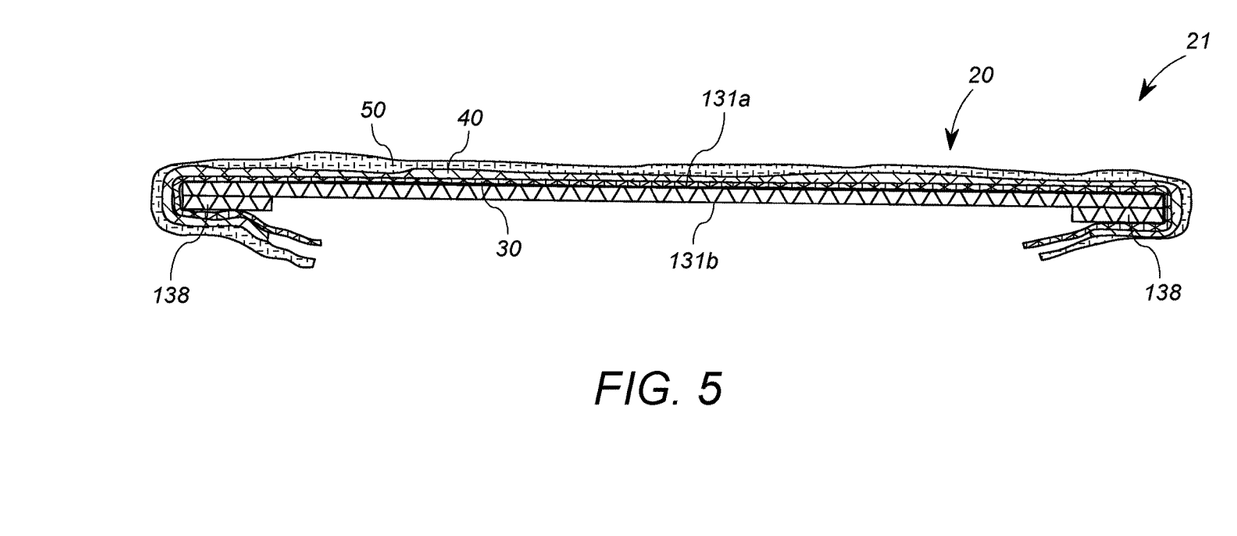
FIG. 5 shows a side cutaway view of the center panel of FIG. 2 in an assembled state.

As shown in FIG. 3, the panel frame 130 includes a panel base 131 and a plurality of folded-under tabs 138, the panel base 131 having a first side 131a and a second side 131b (see FIGS. 4 and 5). Each of the folded-under tabs 138 are integrally formed with the panel base 131. In the exemplary embodiment described herein, the panel base 131 is constructed of corrugated paper and is substantially planar and rectangular in shape. Moreover, in this embodiment, the folded-under tabs 138 are trapezoidal in shape and extend from each edge of the panel base 131.

In assembly, as shown in FIG. 4, the center panel cover 20 is placed over the panel base and coupled to the folded-under tabs 138. As shown in FIG. 5, in the completely assembled center panel 21, the folded-under tabs 138 are folded under a portion of the panel base 131, the fold defining at least a portion of a periphery 136 (see FIG. 3) of the panel base 131. Each of the folded-under tabs 138 are secured to the second side 131b of the panel base 131 preferably using adhesive, such as a thermoplastic or hot melt adhesive.

The center panel cover 20 thus covers the first side of the panel base 131 and is affixed to the folded-under tabs 138. As will be discussed below in connection with FIGS. 6 to 8, the center panel cover 20 is constructed of multiple layers of fabric panels, including a pad. The center panel cover 20 may suitably carry decorative indicia, such as those relating to religious, personal, or other messages or symbols. In this embodiment, the center panel cover 20 includes a decorative stitch pattern 140, as shown in FIG. 2. The center panel cover 120 is affixed to the folded-under tabs 138 using mechanical fasteners, such as staples, or adhesive, such as thermoplastic adhesive.

Figure 6:
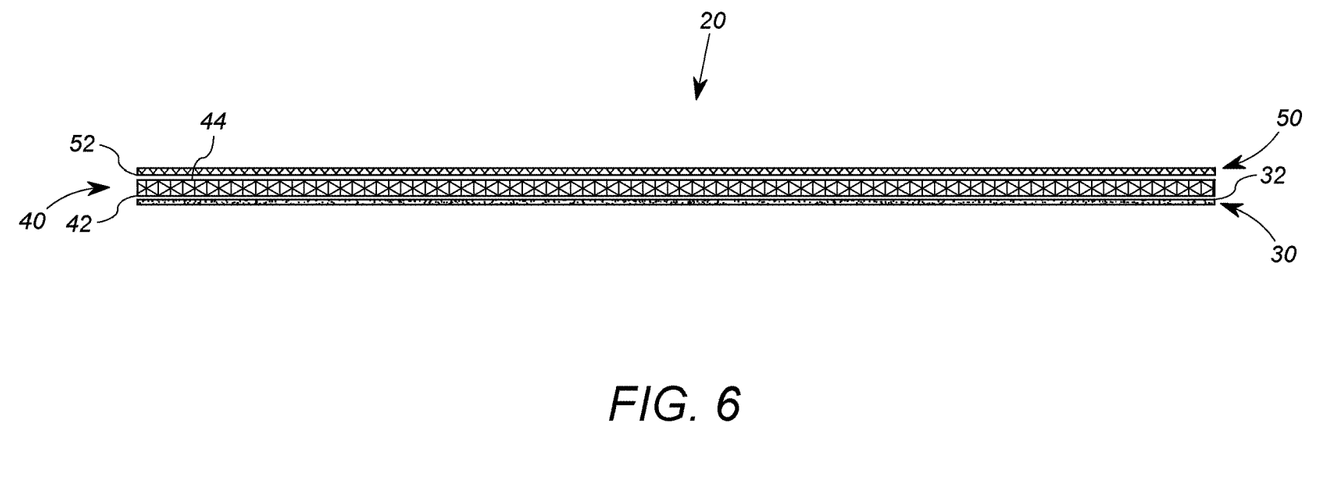
FIG. 6 depicts cross-sectional view of a center panel cover for a center panel of a casket lid according to one embodiment of the disclosure.
Figure 7:
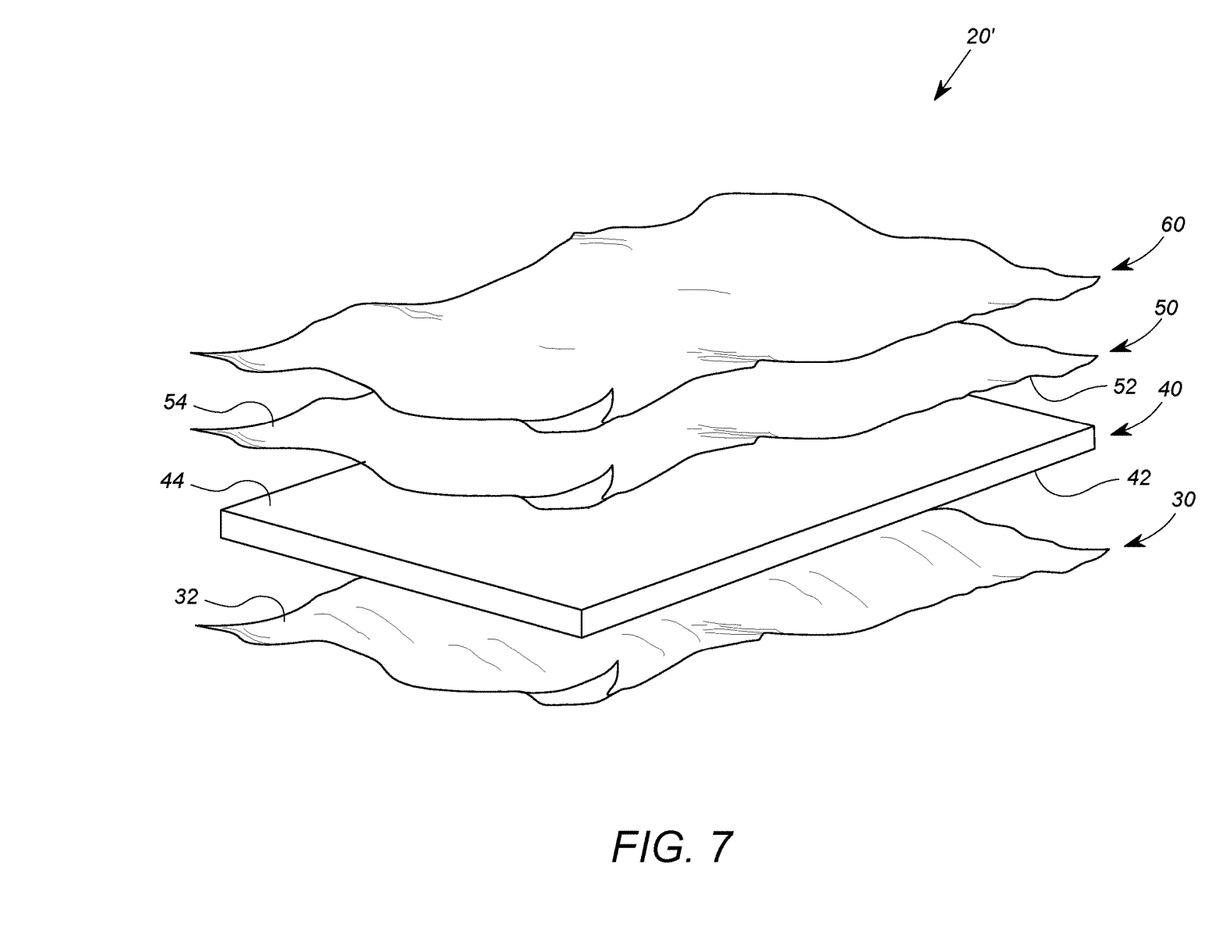
FIG. 7 depicts an exploded perspective view of a center panel cover of a center panel according to another embodiment of the disclosure.
Figure 8:
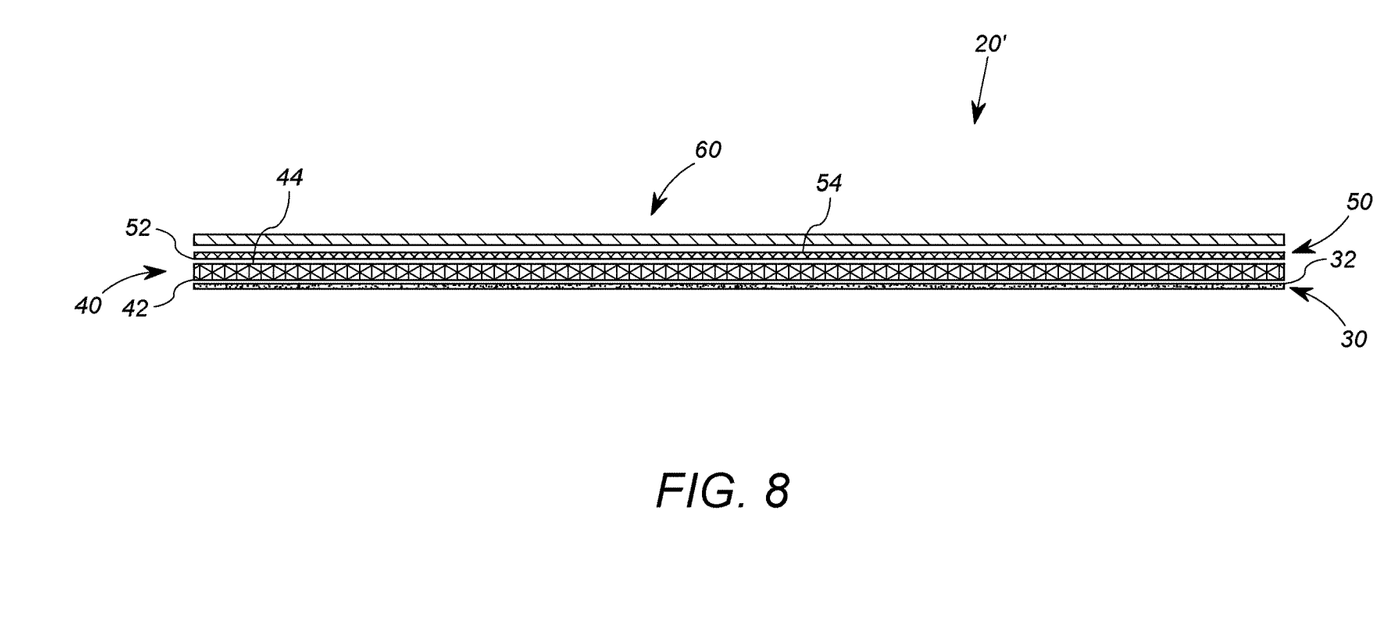
FIG. 8 depicts a cross-sectional view of the center panel cover of FIG. 7.

With reference to FIGS. 6 through 8, the center panel cover 20 of the present embodiment is shown apart from the center panel frame 130. FIG. 6 shows a cross-section of a first embodiment of a center panel cover 20 having three layers. FIG. 7 shows an exploded view of a second embodiment of a center panel cover 20 having four layers. FIG. 8 shows a cross-sectional view of the second embodiment of the center panel of FIG. 7. It will be appreciated that certain thicknesses will be exaggerated for clarity of exposition. It will further be appreciated that the effects of stitching, which can cause localized compression of portions of the center panel cover 20, is omitted in the drawings.

The center panel cover 20 in the embodiment of FIG. 6 includes a backing panel 30, a pad 40, and a blackout panel 50. As shown in FIG. 2, at least the visible portion of the center panel cover 20 is generally rectangular in shape such that it can be accurately and form-fittingly disposed between the plurality of inner edges 18a of the plurality of rolls 18. However, it will be appreciated that the embodiment described herein may be adapted to form center panels having a different shape. As noted above, in some embodiments, the edges of the center panel cover 20 may be folded under and attached to the center panel frame 21. In other embodiments the center panel cover 20 may be coupled to other structures, such as the rolls 18 or the underside of the casket lid itself.

With continued reference to FIGS. 6 to 8, the backing panel 30 is generally a fabric layer that includes a top backing surface 32 that faces upwards towards the other panels of the center panel cover 20. The backing panel 30 serves the purpose of providing a reliable base structure for the other center panel cover 20 panels that can effectively secure the entire assembly together. The backing panel 30 can be sized to meet any size requirement of the burial casket/casket lid in which the center panel cover 20 is to be inserted.

The backing panel 30 may consist of a wide variety of materials that are capable of securely holding the pad 40 and blackout panel 50 in place, in particular the pad 40, as this panel is attached directly to the backing panel 30. For example, a light, non-woven, fusible interfacing fabric material can be used as the backing panel 30. Furthermore, a scrim material, or a polypropylene non-woven fabric, such as those often disposed on the back side of mattress box springs, can both be utilized. In other cases, a woven fabric may be used.

The pad 40 is disposed between the backing panel 30 and the blackout panel 50, with the backing panel 30 being located below the pad 40 and the blackout panel 50 located above the pad 40. The pad 40 is a foam or other light weight pad that includes a lower pad surface 42 which faces toward the backing panel 30, and an upper pad surface 44 which faces toward the blackout panel 50. The pad 40 preferably has a thickness several times that of the backing panel 30 and blackout panel 50.

The blackout panel 50 includes a lower panel surface 52 which faces toward the upper pad surface 44 of the pad 40. The pad 40 can be attached to the backing panel 30 via a variety of methods. Preferably, the pad 40 is sewn or stitched to the backing panel 30. Likewise, the blackout panel 50 can be attached to the pad 40 via a variety of methods, but, preferably, the blackout panel 50 is sewn or stitched to the pad 40. In general, a single stitching operation step can stitch the blackout panel 50 to both the pad 40 and the backing panel 30.

The pad 40 serves the purpose of providing a base for the outer decorative layer or layers that are placed on top of it, in particular the blackout panel 50. The pad 40 can be sized to be the same size as the backing panel 30, but can also be sized to be smaller than the backing panel 30 such that portions of the backing panel 30 extend beyond the edges of the pad 40. It is desirable that the material of the pad 40 is conducive to being sewn or stitched into so as to create minimal lumps and/or imperfections at the seam lines when a layer of material is sewn or stitched on top or bottom of the pad 40. Such a material includes foam, preferably a polyurethane foam. Foam, especially polyurethane foam, provides for a surface that can be easily sewn or stitched through or into. The foam affords a significantly defined appearance in the area around the seam line at which the blackout panel 50 is sewn or stitched to the pad 40. Therefore, the overall appearance of the assembled center panel cover 20 is very clean and smooth, although some imperfections can nevertheless persist from where the pad 40 is sewn or stitched to the backing panel 30. The pad 40 can be as thick as necessary to create the above desired results.

When a foam or polyurethane foam is used for the pad 40, the pad 40 will have a pad color that, disadvantageously, will darken over time such that it can become visible through a layer disposed over the pad 40. Typically, foam pads used for this purpose will initially be white or close to white, and then turn a yellowish color. Certain foam pads can transform into other dark colors as well, all of which are typically visible to an individual viewing the casket 10. In order to hide the pad color from view, the blackout panel 50 advantageously has a color that is lighter than the pad color, and a first opacity that obstructs visibility of the pad color of the pad 40 when the blackout panel 50 is attached to the upper pad surface 44. "Lighter" indicates a color which is closer to the color white than the color black on a scale from white to black. Preferably, the blackout panel 50 is nearly or completely white.

The first opacity of the blackout panel 50 is defined by its material. In order to produce the desired opacity, the blackout panel 50 comprises a material that is sufficiently opaque such that it obstructs most or all visibility of the transformed pad color to an individual viewing the casket 10. It is also preferable that the material is capable of obstructing visibility of any lumps or imperfections created from sewing or stitching the pad 40 to the backing panel 30. It is further preferable that the material is capable of being stretched across the top of the pad 40 so as to create a very smooth appearance. Additionally, because the interior 17 of the casket 10 is often white or very close to white, the blackout panel 50 should be the same or a substantially similar color.

For example, the material of the blackout panel 50 may consist of polyester/cotton insulated drapery lining. As drapery lining is often used in conjunction with window drapes, the material provides a degree of opacity which helps to block bright light from entering a room and filters it, creating a subdued lighting effect. When used as the blackout panel 50, this degree of opacity is sufficient to effectively obscure all visibility of the undesirable darkened colors of the pad 40, as well as hide any imperfections or physical distortions of the pad 40 produces from sewing the panels of the center panel cover 20 together. One such drapery lining is Roc-lon Special Suede Poly/Cotton Insulated Drapery Lining.

In the embodiment of FIGS. 7 and 8, the center panel cover 20' further includes a decorative cloth panel 60. The decorative panel 60 is disposed over and attached to the upper surface 54 of the blackout panel 50. The decorative panel 60 is applied to center panel cover 20 assembly so as to create an aesthetically pleasing surface. The decorative panel 60 preferably is of the same material and color as the cloth coverings used in other parts dispose in the interior 17 of the casket 10, including the covering for the plurality of rolls 18.

Figure 9:
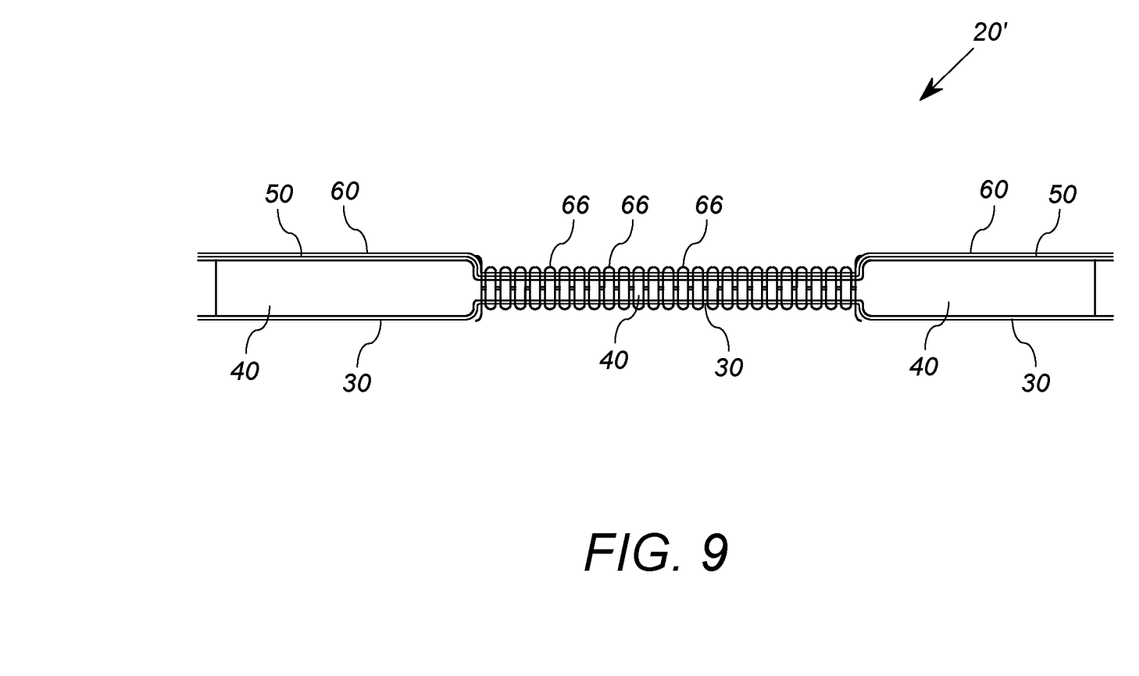
FIG. 9 shows a representative cutaway view of the center panel cover of FIG. 7 depicting stitching the center panel cover.

In one embodiment, the decorative panel 60 and the blackout panel 50 are coupled to the pad 40 and the backing panel 30. FIG. 9 shows a schematic cutaway view of the cover 20' illustrating a plurality of stitches 66 to couple all of the layers 30, 40, 50 and 60 together. FIG. 9 illustrates how the pad 40 may be compressed by such stitching. It will be appreciated that the stitching 66 in this embodiment does not go to the edges, in contrast to the stitching 140 shown in FIG. 2.

The use of a decorative panel 60 disposed over the blackout panel 50 allows the entirety of the interior 17 of the casket 10 have a uniform appearance, even though the blackout panel 50 is of a different and more expensive material than the cloth used in the rest of the casket. While using the material of the blackout panel 50 throughout the rest of the casket interior 17 also creates a uniform appearance, such a solution may be have increased costs because materials suitable for the blackout panel 50 are relatively expensive.

As discussed above, the panels of the center panel cover 20 can be manufactured using a variety of methods, including but not limited to stitching and/or sewing the panels together. It is also foreseeable that the panels can be stitched and/or sewn together via a computer numerical control (CNC) sewing machine that is programmable. In this vein, the backing panel 30 is precut and placed in a fixture. Suitable methods would be known to those of ordinary skill in the art. Then, the pad 40 is precut and placed on top of the backing panel 30 in the fixture, and the backing panel 30 preferably extends beyond the entire perimeter of the pad 40, particular preferably one (1) to two (2) inches from the perimeter of the pad 40. Next, the blackout panel 50 is precut and placed on top of the pad 40 in the fixture. Thereafter, the decorative panel 60 is precut and placed over the blackout panel 50 in the fixture, and can be stretched over the blackout panel 50 to increase smoothness. Finally, the CNC sewing machine is programmed with stitching and/or sewing instructions from an operator, and then executes the instructions to stitch and/or sew the panels together to produce a complete center panel cover 20.

The center panel cover 20 is then placed in the first casket lid section 12 between the plurality of rolls 18. In the embodiment described herein, such placement involves first attaching the center panel cover 20 to the center panel frame 130 to assemble the center panel 21. The completed center panel 21 may then be placed into the interior 15 between the rolls 18.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A center panel cover for a casket, comprising:
    a backing panel including a backing surface;
    a pad including a lower pad surface and an upper pad surface, the lower pad surface disposed on and attached to the backing surface, the pad having a pad color or having an initial color and a characteristic that changes color over time to the pad color; and
    a blackout panel including a lower panel surface disposed on and attached to the upper pad surface, the blackout panel having a first opacity that obstructs visibility of the pad color of the pad, the blackout panel having a color that is lighter than the pad color; and
    wherein the backing panel, pad and blackout panel collectively have a shape and size configured to cover an interior area defined between decorative edge pieces of a casket lid.

2. The center panel cover of claim 1, wherein attachment of the pad to the backing panel creates physical distortions in the pad, and wherein the first opacity is sufficient to obstruct visibility of the physical distortions.

3. The center panel cover as claimed in claim 2, wherein the distortions are created by the sewing of the pad to the backing surface.

4. The center panel cover as claimed in claim 1, wherein the lower pad surface is sewn to the backing surface.

5. The center panel cover as claimed in claim 1, wherein:
    the pad defines an outer pad peripheral surface;
    the backing panel defines an outer backing peripheral surface;
    the outer pad peripheral surface extends beyond the outer backing peripheral surface.

6. The center panel cover as claimed in claim 1, wherein the backing panel is a fusing material, a non-woven material, or a scrim material.

7. The center panel cover as claimed in claim 6, wherein the blackout panel includes an insulated drapery lining material.

8. The center panel cover as claimed in claim 1, further comprising:
    a decorative cloth panel, the decorative panel having an opacity that is less than the first opacity, wherein:
        the blackout panel further includes an upper blackout surface; and
        the decorative panel is disposed over and attached to the upper blackout surface.

9. The center panel cover as claimed in claim 8, wherein the pad is a foam pad.

10. The center panel cover as claimed in claim 9, wherein the pad is a polyurethane pad.

11. The center panel as claimed in claim 1, wherein the pad color is yellow.

12. The center panel as claimed in claim 11, wherein the blackout panel is white.

13. A casket, comprising:
    a casket body including two side panels, two end panels, and a bottom panel;
    a casket lid including a plurality of decorative edge pieces; and
    a center panel disposed between the plurality of decorative edge pieces, the center panel including:
        a backing panel having a backing surface;
        a pad having a lower pad surface and an upper pad surface, the lower pad surface disposed on and attached to the backing surface, the pad having a pad color or having an initial color and a characteristic that changes color over time to the pad color; and
        a blackout panel having a lower panel surface disposed on and attached to the upper pad surface, the blackout panel having a first opacity that obstructs visibility of the pad color of the pad, the blackout panel having a color that is lighter than the pad color; and
    wherein the backing panel, pad and blackout panel collectively cover an interior area defined by the plurality of decorative edge pieces of the casket lid.

14. The casket of claim 13, wherein the center panel further includes a center panel frame shaped and configured to be received between the decorative edge pieces, and wherein the backing panel, pad and blackout panel collective attached to and cover at least one side of the center panel frame.

15. The casket as claimed in claim 13, further comprising:
    a decorative cloth panel, the decorative panel having an opacity that is less than the first opacity, wherein:
        the blackout panel further includes an upper blackout surface; and
        the decorative panel is disposed over and attached to the upper blackout surface.

16. The casket as claimed in claim 15, wherein the pad is a foam pad.

17. The casket as claimed in claim 16, wherein the pad is a polyurethane pad.

18. The casket of claim 17, wherein the center panel further includes a center panel frame shaped and configured to be received between the decorative edge pieces, and wherein the backing panel, pad, blackout panel and decorative panel collectively attached to and cover at least one side of the center panel frame.

19. The casket as claimed in claim 18, wherein the center panel frame is formed of corrugated paper.

20. The casket as claimed in claim 13, wherein attachment of the pad to the backing panel creates physical distortions in the pad, and wherein the first opacity is sufficient to obstruct visibility of the physical distortions.

* * * * *